Jan. 24, 1928.  
E. O. WHEELOCK  
MICROMETER GAUGE  
Filed June 18, 1925  
1,656,927  
2 Sheets-Sheet 1
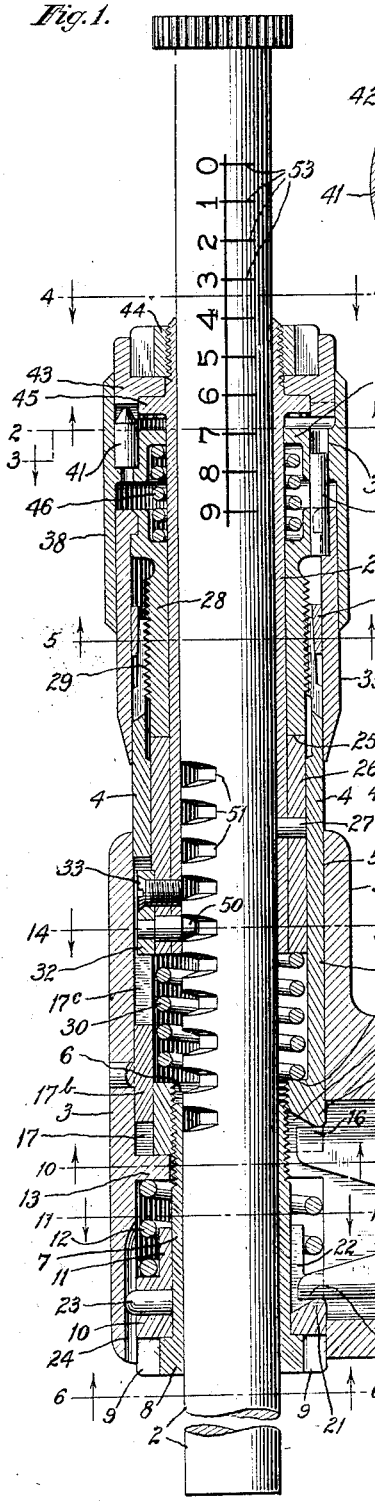
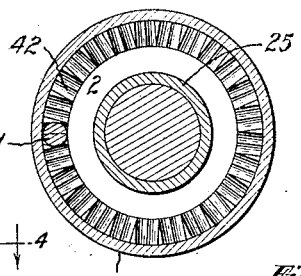
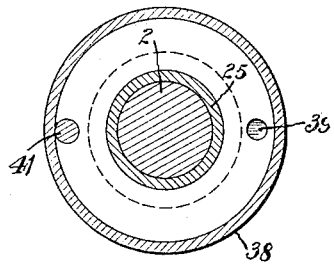
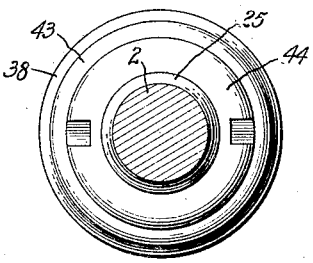
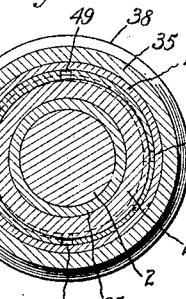
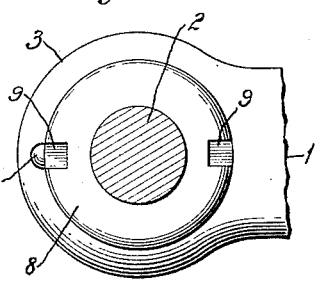
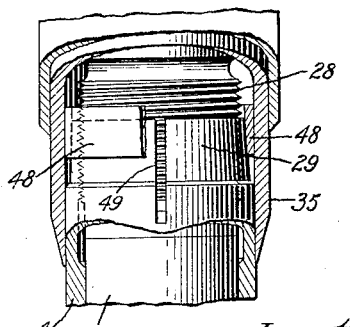
Inventor:  
Ernest O. Wheelock,  
By Chindall Parker Carlson  
Attys.

Jan. 24, 1928. 1,656,927
E. O. WHEELOCK
MICROMETER GAUGE
Filed June 18, 1925   2 Sheets-Sheet 2
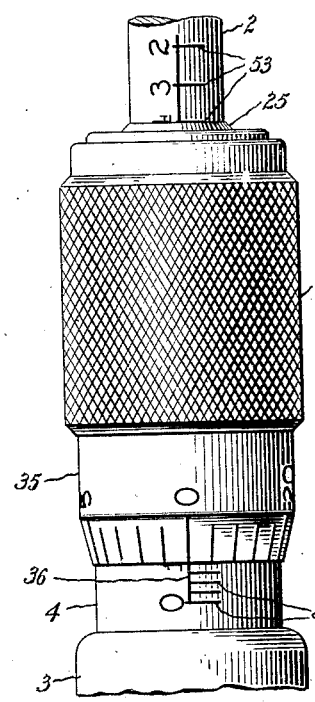
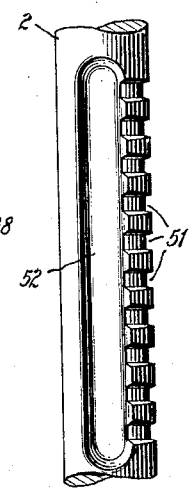
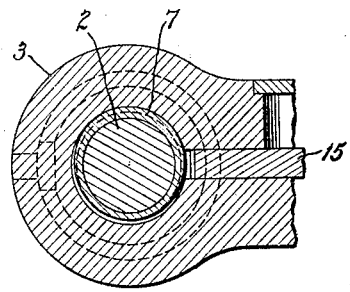
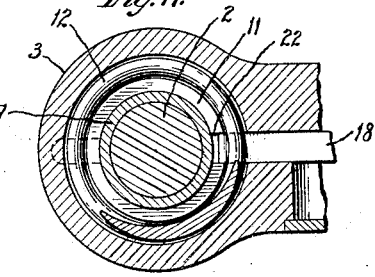
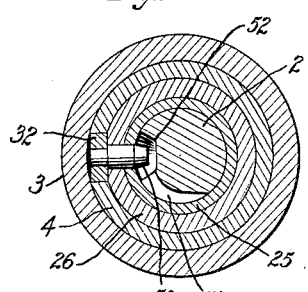
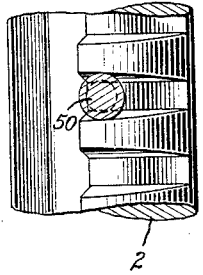
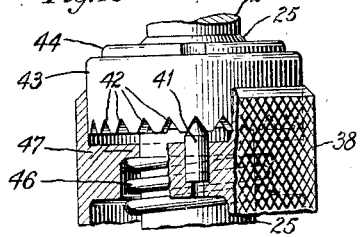
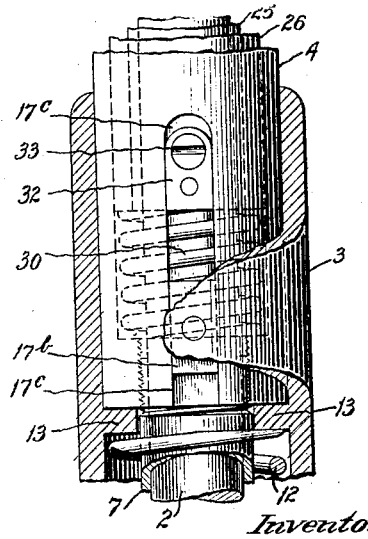
Inventor:
Ernest O. Wheelock,
By Chindahl Parker Carlson
Attys Patented Jan. 24, 1928.

1,656,927

UNITED STATES PATENT OFFICE.

ERNEST O. WHEELOCK, OF ROCKFORD, ILLINOIS.

MICROMETER GAUGE.

Application filed June 18, 1925. Serial No. 37,883.

The ordinary micrometer gauge comprises two contacts between which the part to be gauged or measured is placed. One of the contacts is stationary and the other is adjustable through a range of one inch by a screw one inch long. It is a well known fact that it is extremely difficult to make a one-inch micrometer screw which is accurate throughout its length. This is due in part to errors in the lead or to a staggered or drunken condition of the thread, which grows worse as the thread is lengthened. Moreover, even if the thread were accurately made it would be extremely difficult to maintain the thread in proper condition, since nearly all micrometers, especially those on production work, are used mostly on some particular size, so that excessive wear takes place on a certain part of the screw thread. It is impracticable to take up the backlash entirely at the place where such wear has occurred without making the screw too tight at some other place.

One of the objects of the present invention is to reduce to a great extent the amount of movement necessary to be imparted to a micrometer screw. This object is attained by making the contact detachable from the screw and by providing means whereby the contact may be connected to the screw in various positions, say, one-tenth of an inch apart. It will be seen that by providing coarse adjustments by tenths of an inch, the fine adjustment to hundredths and thousandths of an inch may be obtained by means of a micrometer screw having a maximum movement of only one-tenth of an inch, thus eliminating nine-tenths of the trouble due to error in the lead and to a staggered condition of the thread. The use of a short micrometer screw also permits of using a coiled compression spring to press against the end of the screw and thus keep a uniform tension on the thread, thereby equalizing the wear and taking up all backlash.

Other objects and advantages of the invention will become apparent as the description proceeds.

In the accompanying drawings, Figure 1 is a fragmental view, on a greatly enlarged scale, of a micrometer limit snap gauge embodying the features of my invention.

Figs. 2, 3, 4, 5 and 6 are sectional views taken on lines 2—2, 3—3, 4—4, 5—5, and 6—6, respectively, of Fig. 1.

Fig. 7 is a fragmental elevation showing the means for taking up wear of the screw threads.

Fig. 8 is a fragmental side elevation of the upper portion of the device.

Fig. 9 is a fragmental detail view of the contact spindle.

Figs. 10 and 11 are sectional views taken on lines 10—10 and 11—11, respectively, of Fig. 1.

Fig. 12 is a fragmental side view showing means for preventing rotative displacement of certain parts.

Fig. 13 is a sectional view of the contact spindle.

Fig. 14 is a section on the line 14—14 of Fig. 1.

Fig. 15 is a fragmental elevation showing the means for detachably securing the contact spindle in position for movement by the micrometer screw.

Fig. 16 is a fragmental elevation showing the means for locking the micrometer screw in adjusted position.

The invention is herein shown as embodied in a limit snap gauge of the type disclosed in my application Serial No. 30,426, filed May 15, 1925 (now Patent No. 1,639,231, dated August 16, 1927). Only a portion of the U-shaped body or frame 1 of the gauge is shown. The part to be measured or gauged is placed between two opposed contacts, one of which is adjustably mounted in the gauge frame and the other of which is mounted in alinement with the first mentioned contact and arranged to be pressed by a spring against the part to be gauged. The first mentioned contact is not shown in the present drawing, as the invention has no particular reference thereto. The second mentioned contact is indicated herein at 2. It consists of a cylindrical rod adjustably connected to a structure which is mounted for reciprocation within a tubular head 3 on the gauge frame. Said reciprocatory structure comprises a sleeve or barrel 4 mounted in the bore 5 of the tubular support or head 3, the barrel 4 having at its lower end an internally threaded opening 6 to receive the threaded upper end of a sleeve 7. On the lower end of the sleeve 7 is an annular flange 8 (Fig. 6) having notches 9 to receive a tool for use in screwing the sleeve 7 into the barrel 4. A hardened collar 10 surrounds the sleeve 7 and bears against the flange 8. Surrounding the reduced upper end 11 of the collar 10 is a coiled expansive spring 12 which bears at its ends against the collar 10 and against an annular flange 13 extending into the bore 5. It will be seen that the spring 12 tends to move downwardly the sleeves 4 and 7 and the contact 2, and normally holds the lower end of the sleeve 4 pressed against the flange 13.

Means is provided whereby the operator may move the sleeves 4 and 7 and the contact spindle 2 carried thereby, against the pressure of the spring 12, to raise said contact spindle in order to allow the part to be gauged to be slipped into position between the two opposed contacts. The means herein shown for this purpose comprises a lever 14 pivoted to the gauge frame at 15 and having a rounded surface 16 that bears against a rounded, relatively thin edge 17 formed upon the sleeve 4. As indicated in Fig. 1, the lever 14 projects into a notch 17$^a$ in the lower end of the sleeve 4. The sleeve structure 4 and 7 is held against rotational displacement by means of a key 17$^b$ attached to the head 3 and lying within a slot 17$^c$ formed in one side of the sleeve 4. Said slot is best shown in Fig. 12. The lever 14 may be operated in the manner shown in my aforesaid patent or in any other preferred way.

If desired, indicating mechanism of the form shown in the patent hereinbefore alluded to, or of any other preferred character may be employed. The means for sensing the position of the contact, or for communicating motion from the contact spindle 2 to the indicating mechanism, may be of any desired construction and may include a contact lever 18 pivotally mounted in the gauge frame at 19 and having a rounded surface 20 which lies in contact with a rounded, relatively thin edge 21 formed at the lower end of a slot 22 in the collar 10. As shown in Fig. 1, the end of the lever 18 projects into the slot 22. The collar 10 is held against rotational displacement by means of a pin 23 carried by said collar and projecting into a groove 24 formed in the lower end of the tubular head 3.

A means of adjusting the position of the pointer on the indicating dial is provided by changing the position of the sleeve 7 in the threaded opening 6. This is accomplished by inserting a spanner wrench or other similar tool in the apertures 9 in the annular flange 8, and turning it in the direction required.

The contact spindle 2 is connected to the reciprocatory sleeve structure 4 and 7 by means which permits a coarse adjustment of the position of the contact spindle to be made quickly, means also being employed to permit a fine adjustment of the contact spindle to the desired position. The connecting means affording such adjustments of the contact spindle with reference to the sleeve structure 4 and 7 comprises a sleeve 25 through which the contact spindle extends. The sleeve 25 is provided with an external annular shoulder 25$^a$ by rigidly securing to said sleeve an encircling sleeve 26 by means of a pin 27. The sleeve 26 fits slidably within the barrel 4. The sleeve 25 is connected to the barrel 4 for fine adjustment by means including a tubular micrometer screw 28 which surrounds the sleeve 25 and bears at one end against the shoulder 25$^a$. The screw 28 engages the internally screw-threaded portion 29 of the barrel 4. A coiled expansive spring 30 surrounds the contact spindle 2 and lies between an internal annular shoulder 31 near the lower end of the barrel 4 and the lower end of the sleeve structure 25 and 26. It will be seen that the spring 30 serves to hold the shoulder 25$^a$ pressed against the lower end of the adjusting screw 28.

The sleeve structure 25 and 26 is held against rotational displacement by means of a plate or key 32 secured to the lower portion of the sleeve structure 25 and 26 by means of a screw 33. The key 32 lies within the longitudinal slot 17$^c$ formed in the barrel 4.

Means is provided whereby the position of the adjusting screw 28 with reference to the barrel 4 may be readily observed. Said means comprises a thimble 35, the upper end of which is rigidly secured to the upper end of the screw 28, as by riveting.

The thimble 35 fits rotatably upon the barrel 4 and its beveled lower end is graduated (as shown in Fig. 8) to indicate the extent of rotation of the micrometer screw. The micrometer screw 28 has forty thread-convolutions per inch. (Notwithstanding the fact that Fig. 1 is drawn upon a large scale, it is impracticable to illustrate forty thread-convolutions per inch, hence as to this feature of the device the illustration is merely diagrammatic.) One revolution of the micrometer screw and the attached thimble 35 therefore moves the contact spindle one-fortieth or twenty-five one-thousandths of an inch. One twenty-fifth of a revolution of the micrometer screw would therefore move the contact spindle one-thousandth of an inch. Consequently the beveled lower end of the thimble 35 is graduated to indicate twenty-fifths of a revolution. The barrel 4 is provided with a zero line 36, and is graduated longitudinally, as at 37, to indicate fortieths of an inch. One complete revolution of the thimble 35 and the micrometer screw 28 will move the lower end of the thimble 35 from one graduation 37 to the next.

Means is provided for rotating the micrometer screw 28 and locking it in adjusted position. While such means may partake of various forms, it is herein shown as comprising a knurled sleeve 38 fitting slidably upon the thimble 35 and having a longitudinal extending hole 39 to slidably receive a pin 40 fixed to the micrometer screw 28 and the thimble 35. The sleeve 38 carries a pin 41 having a conical end adapted to engage serrations 42 (Figs. 2 and 16) formed upon the lower side of a collar 43. Said collar is rigidly secured to the sleeve 25 by means of a nut 44 which clamps the collar against an annular flange 45 on the sleeve 25. A coiled expansive spring 46 interposed between the micrometer screw 28 and an internal flange 47 on the knurled sleeve 38 yieldingly holds the locking pin 41 in engagement with the serrated surface of the collar 43. There are twenty-five tooth spaces in the locking collar 43, hence the micrometer screw 28 may be locked in positions representing adjustments of one one-thousandth of an inch.

In order to take up wear of the micrometer screw 28 and the screw-threaded portion of the barrel 4 I provide means which, while it may be of any desired character, consists preferably of a tapered ring 48 lying between the thimble 35 and the tapered upper end of the barrel 4. The upper end of said barrel is slotted, as indicated at 49 in Figs. 5 and 7, so that the screw-threaded portion of said barrel may be contracted into proper engagement with the micrometer screw by forcing the tapered ring 48 downwardly to the necessary extent.

The means for connecting the contact spindle 2 to the sleeve 25 is of such character as to permit of quick adjustment of the contact spindle through a distance of one-tenth of an inch or multiples of such distance. In the embodiment herein shown of the invention, said means comprises a pin 50 attached to the sleeve 25 and having a tapered end adapted to enter any one of ten correspondingly tapered openings 51 arranged along the length of the contact spindle 2 at intervals of one-tenth of an inch. In order that the contact spindle 2 shall be readily disengageable from the connecting pin 50, the openings 51 merge at one end into a longitudinal groove or channel 52 formed in the contact spindle (see Fig. 9). In order that the connecting pin 50 may be wedged in the openings 51 so that the contact spindle 2 may be locked in registering position, said openings are in the form of transverse grooves cut eccentrically of the contact spindle, as indicated in Fig. 13. As the grooves 51 extend away from the channel 52 they become narrower due to their eccentric formation, as shown in Fig. 15. In other words, the side walls of each groove 51 approach each other as they recede from the channel 52, thus constituting a wedge-shaped opening into which the tapered pin 50 may be forced by turning the contact spindle 2 in the direction to carry the channel 52 out of register with the pin.

On the exposed upper end of the contact spindle 2 is a longitudinal series of graduations 53 representing tenths of an inch. The upper end of the sleeve 25 serves as a zero or datum line.

Assuming the present invention to be embodied in a limit snap gauge having an indicating dial as disclosed in my said Patent No. 1,639,321, the mode of adjustment and use is as follows: The contact 2 should be brought against the aforementioned adjustable contact which is located in opposition to it, and the zero line on the thimble 35 should be brought in engagement with the zero line on the barrel 4. With the parts in this position it is possible to vary the position of the pointer on the indicating dial. By referring to the previously mentioned patent the method of adjusting this pointer will be apparent. It is briefly noted that the aforementioned adjustable contact (not shown) is moved in the direction required to bring the pointer to zero. Once the various mechanisms are all indicating zero, it should not be necessary to make the foregoing adjustments, except at long intervals.

One of the advantages of the micrometer construction shown herein, over the gauge in the aforementioned patent, is that it may be positioned without the use of a master block, or the use of the part desired to be duplicated. In lieu of this, the micrometer is merely set so as to give the desired readings, and then the gauge is ready for use. The part to be tested is then placed between the contacts, the contact spindle 2 being withdrawn slightly to receive such part by means of the lever 14. When the operator releases the lever 14 the spring 12 presses the contact spindle 2 against the part to be gauged, a variation of said part above or below the desired dimension being indicated by the position of the pointer.

The operation of the micrometer as herein disclosed is as follows:

The contact spindle 2 is moved toward or away from the opposed contact to the desired distance within one-tenth of an inch, and locked in such a position by wedging the pin 50 in the proper groove 51. If, for example, the gauge is to be set to measure a dimension of .451 of an inch, the contact spindle 2 is adjusted to bring the graduation 53 marked "4" on said spindle, into register with the upper end of the sleeve 25. The knurled sleeve 38 is then pressed downwardly to disengage the locking pin 41 from the serrations 42 on the collar 43, and said knurled sleeve is rotated through two revolutions in the reverse direction, the spring 30 keeping the shoulder 25$^a$ pressed against the end of the micrometer screw 28. Two revolutions of the screw 28 retracts the contact spindle fifty one-thousandths of an inch. The micrometer screw is then rotated to bring the first graduation beyond the zero line on the thimble 35 into register with the zero line on the barrel 4, whereby the contact spindle 2 is retracted another one-thousandth of an inch, thus placing the contact spindle .451 of an inch away from the opposed contact.

It will be seen that by the construction herein disclosed the errors due to initial inaccuracies and wear of the micrometer screw are greatly reduced; that the number of turns required in adjusting the movable contact through its maximum range is reduced from forty to four, the greater portion of the adjustment being quickly obtained by means of the adjustable connection between the contact spindle and the sleeve 25; and that the desired fine adjustment by means of the micrometer screw 28 is definitely determined through the engagement of the locking pin 41 with the serrated locking collar 43. The means just referred to for setting and locking the micrometer screw in adjusted position at exact thousandths of an inch, when used in connection with a dial reading to ten thousandths of an inch, plus or minus, as disclosed in my said patent, eliminates the time and skill required to set and read ten thousandths of an inch by the Vernier method used on the ordinary micrometer and in which the readings of two persons seldom, if ever, agree.

With the improvements herein disclosed all of the doubtful points which are a source of endless disputes and arguments when the ordinary micrometer and snap and limit gauges are used, are resolved to a certainty. As a result, measurements made by any number of persons are bound to agree, the average person with no experience or skill in such matters obtaining the same results as the most skilled and experienced.

While the invention has been herein shown as embodied in a snap gauge, it will be understood that it is applicable to other types of gauges. Moreover, the detailed description of the present construction has been given for the purpose of imparting a clear understanding of the invention and not for the purpose of limiting the invention to the details shown, the scope of the invention being indicated in the appended claims. While the instrument is herein shown as graduated in decimals of inches, it will be evident that it might be graduated on the metric system.

I claim as my invention:

1. A micrometer gauge having, in combination, a tubular support, a barrel slidably but nonrotatably mounted in said support, a sleeve having a screw-thread engagement with the lower end of said barrel, said tubular support having an internal flange, a coiled expansive spring within said tubular support and bearing at its ends against said sleeve and said flange and serving normally to hold the lower end of the barrel against said flange, a second sleeve slidably but non-rotatably mounted within said barrel, said second sleeve having an external shoulder, a tubular micrometer screw bearing against said shoulder, a coiled expansive spring within the lower portion of said barrel and bearing against the second sleeve to hold said shoulder against the end of said screw, said screw engaging the upper screw-threaded portion of said barrel, a thimble secured to said screw and surrounding said barrel, the lower end of said thimble being peripherally graduated to indicate thousandths and the barrel having a zero line to coact with said graduations, said zero line being longitudinally graduated in divisions of twenty-five one-thousands, a third sleeve surrounding said thimble and slidably but non-rotatably connected therewith, a serrated locking collar fixed to the second sleeve, a locking pin on the third sleeve adapted to engage said serrations, a coiled expansive spring interposed between the screw and the third sleeve for yieldingly holding said pin in engagement with the serrated collar, a connecting pin attached to the second sleeve, and a contact spindle having a longitudinal channel to receive said connecting pin, there being a longitudinal series of equidistant openings in said spindle merging in said channel, said pin being adapted to enter and become wedged in any of said openings.

2. A micrometer gauge having, in combination, a barrel, a sleeve slidably but non-rotatably mounted within said barrel, said sleeve having an external shoulder, a tubular micrometer screw bearing against said shoulder, a coiled expansive spring within the lower portion of said barrel and bearing against said sleeve to hold said shoulder against the end of said screw, said screw engaging the upper screw-threaded portion of said barrel, a thimble secured to said screw and surrounding said barrel, the lower end of said thimble being peripherally graduated to indicate thousandths and the barrel having a zero line to coact with said graduations, said zero line being longitudinally graduated in divisions of twenty-five one-thousandths, means to lock the screw in adjusted position, and a contact spindle having an adjustable connection with the screw.

3. A micrometer gauge having, in combination, a barrel, a sleeve slidably but non-rotatably mounted within said barrel, said sleeve having an external shoulder, a tubular micrometer screw bearing against said shoulder, a coiled expansive spring within the lower portion of said barrel and bearing against said sleeve to hold said shoulder against the end of said screw, said screw engaging the upper screw-threaded portion of said barrel, a thimble secured to said screw and surrounding said barrel, the lower end of said thimble being peripherally graduated to indicate thousandths and the barrel having a zero line to coact with said graduations, said zero line being longitudinally graduated in divisions of twenty-five one-thousandths, and a contact arranged to be moved by the screw.

4. A micrometer gauge having, in combination, a tubular support, a barrel slidably but nonrotatably mounted in said support, a sleeve having a crew-thread engagement with the lower end of said barrel, said tubular support having an internal flange, a coiled expansive spring within said tubular support and bearing at its ends against said sleeve and said flange and serving normally to hold the lower end of the barrel against said flange, a lever engaging said sleeve to sense the position thereof, a lever engaging said barrel to move the latter against the action of the spring, a micrometer screw engaging the upper screw-threaded portion of said barrel, a thimble secured to said screw and surrounding said barrel, the lower end of said thimble being peripherally graduated to indicate thousandths and the barrel having a zero line to coact with said graduations, said zero line being longitudinally graduated in divisions of twenty-five one-thousandths, and a contact arranged to be moved by the screw.

5. A micrometer gauge having, in combination, a screw, a tapered pin associated with the screw to move therewith, and a contact spindle having a longitudinal channel in which said pin may move, there being a series of equidistant locking openings arranged along said channel and merging therein, said pin being adapted to enter any of said openings, each of said openings consisting of an eccentrically formed groove having inclined side walls conforming to the taper of the pin.

6. A micrometer gauge having, in combination, a screw, a pin associated with the screw to move therewith, and a contact spindle having a longitudinal channel in which said pin may move, there being a series of equidistant locking openings arranged along said channel and merging therein, said pin being adapted to enter any of said openings.

7. A micrometer gauge having, in combination, a screw, a pin associated with the screw to move therewith, and a contact spindle having a longitudinal series of equidistant locking openings to receive said pin, said spindle being engageable with and disengageable from said pin by rotative movements of the spindle.

8. A cylindrical contact spindle for a micrometer gauge, said spindle having a longitudinal groove and a series of locking openings at one side of the groove, said openings communicating with the groove, and each opening tapering away from the groove.

In testimony whereof, I have hereunto affixed my signature.

ERNEST O. WHEELOCK.

CERTIFICATE OF CORRECTION.

Patent No. 1,656,927.   Granted January 24, 1928, to

ERNEST O. WHEELOCK.

It is hereby certified that error appears in the printed specification of the above numbered patent requiring correction as follows: Page 1, line 84, for "No. 1,639,231" read "No. 1,639,321"; page 3, lines 4 and 5, for the word "longitudinal" read "longitudinally"; page 5, line 17, claim 4, for the compound word "crew-thread" read "screw-thread"; and that the said Letters Patent should be read with these corrections therein that the same may conform to the record of the case in the Patent Office.

Signed and sealed this 21st day of February, A. D. 1928.

Seal.

M. J. Moore,
Acting Commissioner of Patents.